US011570684B2

(12) United States Patent
M et al.

(10) Patent No.: US 11,570,684 B2
(45) Date of Patent: Jan. 31, 2023

(54) TRUSTED SOURCE ROUTING PROTOCOLS FOR WIRELESS MESH NETWORKS USING ATTESTATION METHOD

(71) Applicant: Cisco Technology, Inc., San Jose, CA (US)

(72) Inventors: Niranjan M M, Karnataka (IN); Nagaraj Kenchaiah, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 179 days.

(21) Appl. No.: 17/034,615

(22) Filed: Sep. 28, 2020

(65) Prior Publication Data

US 2022/0104100 A1 Mar. 31, 2022

(51) Int. Cl.
*H04W 40/02* (2009.01)
*H04W 84/18* (2009.01)
*H04B 17/318* (2015.01)
*H04L 45/00* (2022.01)
*H04W 48/16* (2009.01)

(52) U.S. Cl.
CPC .......... *H04W 40/02* (2013.01); *H04B 17/318* (2015.01); *H04L 45/26* (2013.01); *H04W 48/16* (2013.01); *H04W 84/18* (2013.01)

(58) Field of Classification Search
CPC ..... H04W 40/02; H04W 48/16; H04W 84/18; H04B 17/318
USPC ......................................................... 370/329
See application file for complete search history.

(56) References Cited

U.S. PATENT DOCUMENTS

| | | | |
|---|---|---|---|
| 9,940,486 B2 | 4/2018 | Grieco et al. | |
| 10,735,308 B2* | 8/2020 | Voit | H04L 63/12 |
| 11,245,484 B2 | 2/2022 | Bhandari et al. | |
| 11,277,264 B2 | 3/2022 | Psenak et al. | |

(Continued)

FOREIGN PATENT DOCUMENTS

WO     2020/206201 A1    10/2020

OTHER PUBLICATIONS

TCG Public Review, "TCG Guidance for Securing Network Equipment", Version 1.0 Revision 26b, Jul. 3, 2017, 61 pages.

(Continued)

*Primary Examiner* — Chuck Huynh
(74) *Attorney, Agent, or Firm* — Edell, Shapiro & Finnan, LLC

(57) ABSTRACT

A method is performed by a destination node connected to wireless mesh routers configured to implement a source routing protocol in which the mesh routers propagate route request packets broadcasted by a source node to the destination node, the mesh routers add their addresses to accumulated paths in the route request packets, and add to the accumulated paths trust indicators that indicate whether mesh routers among the mesh routers from previous hops along the accumulated paths are trusted or compromised. The destination node receives the route request packets which convey the accumulated paths. The destination node determines trusted paths among the accumulated paths for which all of the mesh routers along the accumulated paths are trusted based on the trust indicators for the accumulated paths. The destination node determines a preferred path among the trusted paths, and forwards an indication of the preferred path to the source node.

20 Claims, 8 Drawing Sheets

(56) References Cited

U.S. PATENT DOCUMENTS

| | | | |
|---|---|---|---|
| 2004/0025018 A1* | 2/2004 | Haas | H04W 12/106 |
| | | | 713/168 |
| 2015/0078182 A1* | 3/2015 | Das | H04W 24/04 |
| | | | 370/252 |
| 2015/0264626 A1 | 9/2015 | Perdomo | |
| 2019/0045034 A1 | 2/2019 | Alam | |
| 2020/0084202 A1 | 3/2020 | Smith et al. | |

OTHER PUBLICATIONS

TCG Public Review, "TCG Guidance for Securing Network Equipment Using TCG Technology", Version 1.0 Revision 29, Jan. 17, 2018, 58 pages.

Michael Jarrett et al., "Trusted Computing for Protecting Ad-hoc Routing", CNSR'06, IEEE, May 2006, 8 pages.

T. Clausen, Ed. et al., "Optimized Link State Routing Protocol (OLSR)", Network Working Group, Oct. 2003, 76 pages.

T. Clausen et al., "Security Threats to the Optimized Link State Routing Protocol Version 2 (OLSRv2)", Internet Engineering Task Force (IETF), May 2017, 26 pages.

D. Johnson et al., "The Dynamic Source Routing Protocol (DSR) for Mobile Ad Hoc Networks for IPv4", Section 7.2, Network Working Group, Feb. 2007, 3 pages.

* cited by examiner

FIG.6

DSR / OLSR PACKET 600

| OPTION TYPE | TBD (TO BE ALLOCATED BY IANA) | 602 |
|---|---|---|
| OPTION LENGTH (VARIABLE) | 2 TO 252 BYTES | 604 |
| OPTION VALUE (ATTESTATION INFORMATION) | ID (1 BYTE): DEFINES THE ID OF THE FOLLOWING TOKEN, IT TAKES VALUE FROM 0 TO 254 (ID=255 IS RESERVED)<br><br>TOKEN: 1 TO 251 BYTES OF BINARY DATA<br><br>USING THE FIRST BYTE OF THE VALUE OF AN ID TO DISTINGUISH DIFFERENT TYPES OF ATTESTATION TOKEN | 606 |

| OPTION TYPE | DSR OLSR ATTESTATION TOKEN (SUGGESTED VALUE TO BE ASSIGNED BY IANA) | 602 |
|---|---|---|
| OPTION LENGTH (VARIABLE) | 17 BYTES | 604 |
| OPTION VALUE (ATTESTATION INFORMATION) | 0X0A000102030405060708090A0B0C0D0E0F<br><br>(HERE FIRST BYTE 0A IS THE TOKEN TYPE FOR HARDWARE FINGERPRINT, REMAINING 16 BYTES IS THE ATTESTATION INFORMATION FOR THE HARDWARE FINGERPRINT) | 606 |

TRUSTED SOURCE ROUTING PROTOCOLS FOR WIRELESS MESH NETWORKS USING ATTESTATION METHOD

TECHNICAL FIELD

The present disclosure relates to source routing protocols for wireless mesh networks.

BACKGROUND

Dynamic Source Routing (DSR) and Optimized Link State Routing (OLSR) protocols are popular on-demand source routing protocols used in multi-hop wireless mesh networks (WMNs). The DSR protocol is simple, robust, and efficient in construction of routes, guarantees loop-free routing and provides load balancing. Similar to DSR, the OLSR protocol is also simple, guarantees loop-free routing, and provides load balancing. Unfortunately, both DSR and OLSR protocols are vulnerable to several attacks such as malicious nodes injecting bogus routing information, formation of feedback loops by colluding adversarial nodes, identity spoofing, link spoofing, replay attacks, and the like. When an attack on a mesh router (MR) in a WMN compromises the MR, the MR is no longer considered a trusted entity, which leads to non-optimized and non-secure path selection in the WMN.

BRIEF DESCRIPTION OF THE DRAWINGS

FIG. 6 is an illustration of a generic protocol extension option for Dynamic Source Routing (DSR)/Optimized Link State Routing (OLSR) protocol packets, according to an example embodiment.

FIG. 7 is an illustration of examples of protocol extension options of the DSR/OLSR packets, according to an example embodiment.

DESCRIPTION OF EXAMPLE EMBODIMENTS

Overview

Figure 1:
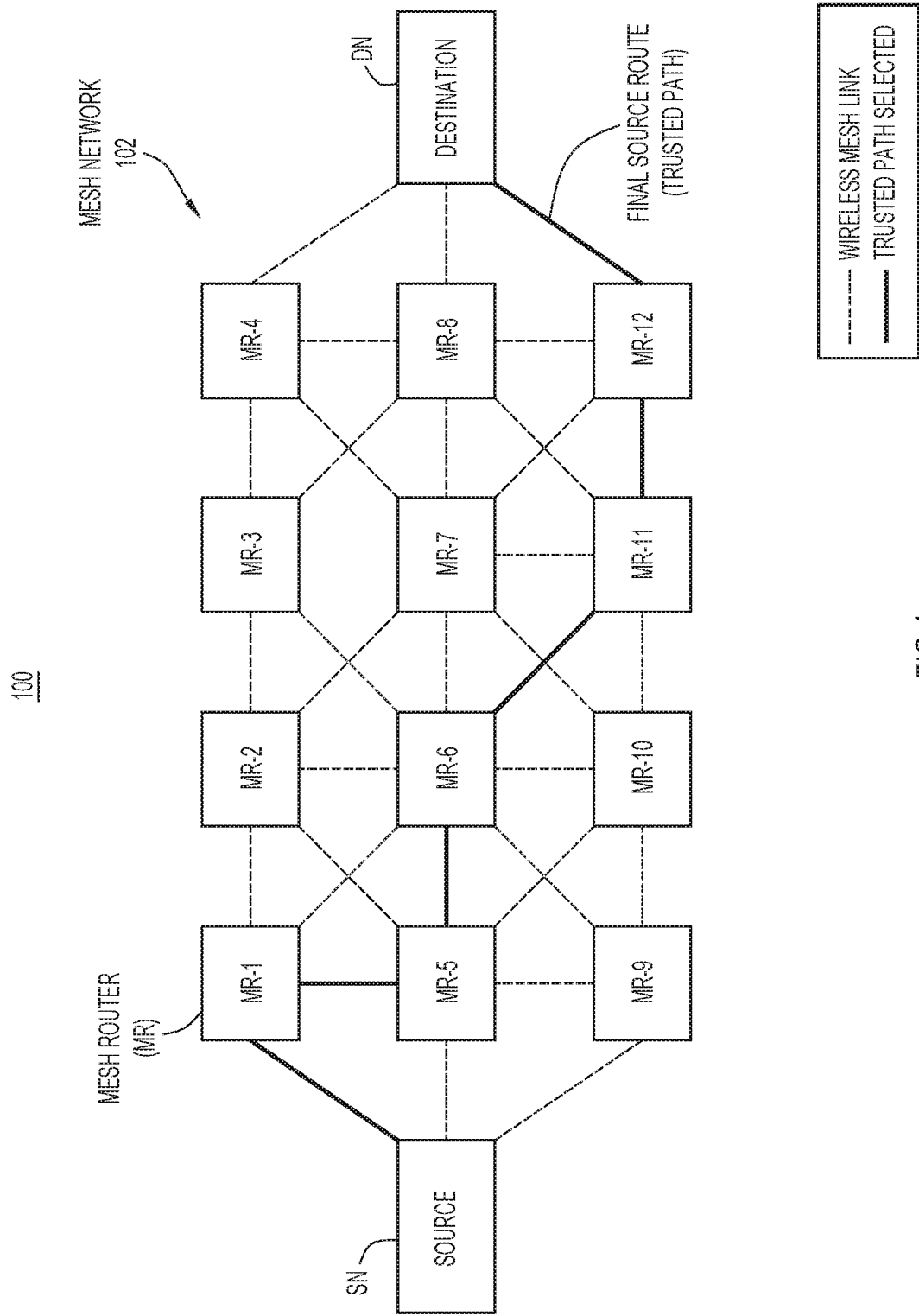
FIG. 1 is a block diagram of an example wireless mesh network (WMN) configured to implement source routing protocols extended to include attestation methods to establish trust between nodes in the WMN, according to an example embodiment.

A method is performed by a destination node connected to a network of wireless mesh routers configured to implement a source routing protocol in which the mesh routers propagate route request packets broadcasted by a source node to the destination node, the mesh routers configured to process the route request packets by adding their addresses to accumulated paths in the route request packets, and by adding, to the accumulated paths, trust indicators that indicate whether mesh routers among the mesh routers from previous hops along the accumulated path are trusted or compromised. The destination node receives from the mesh routers the route request packets, which convey the accumulated paths. The destination node determines trusted paths among the accumulated paths for which all of the mesh routers along the accumulated paths are trusted based on the trust indicators for the accumulated paths. The destination node determines a preferred path among the trusted paths, and forward an indication of the preferred path to the source node via the mesh routers.

EXAMPLE EMBODIMENTS

A wireless mesh network (WMN) is a multi-hop radio network whose nodes include Internet Protocol (IP) routers each having one or more wireless interfaces, typically based on IEEE 802.11 WiFi® technologies. In an example, a backbone of a WMN comprises dedicated wireless nodes called mesh routers (MRs), which are configured in an ad-hoc mode and use omnidirectional antennas. With 802.11ax, which supports higher bandwidth, WMN will be prominent in the ad-hoc wireless network deployments.

The MRs can freely organize into virtually any network topology, and communicate with each other using source routing protocols, such as a Dynamic Source Routing (DSR) protocol, an Optimized Link State Routing (OLSR) protocol, and the like. Resource constraints on the MRs, limited capacity of the wireless medium over which the MRs communicate, MR mobility, and the self-organized form of the network all contribute to difficulties in implementing methods for securing traditional wired networks to the aforementioned ad-hoc wireless mesh networking environment.

The DSR and OLSR protocols are popular on-demand source routing protocols used in multi-hop wireless mesh networks. The DSR protocol is simple, robust, and efficient in construction of routes, guarantees loop-free routing, and provides load balancing. Similar to DSR, the OLSR protocol is also simple, guarantees loop-free routing, and provides load balancing. Unfortunately, both the DSR and OLSR protocols are vulnerable to several attacks such as malicious nodes injecting bogus routing information, formation of feedback loops by colluding adversarial nodes, identity spoofing, link spoofing, replay attacks, and the like. When an attack on an MR in the WMN compromises the MR, the MR is no longer considered a trusted entity, which leads to non-optimized and non-secure path selection in the WMN.

A conventional approach to mitigating such attacks is to use cryptographic methods to authenticate information exchanged between MRs in the WMN during a route discovery process, such as symmetric key method, asymmetric key method, and aggregate signature method. The aforementioned authentication methods do not provide sufficient trustworthiness among the MRs when selecting a best and optimal path (i.e., a preferred path) of the MRs to form a wireless back-haul. In addition, due to the dynamic nature of the MRs, including wireless operation, node mobility, and self-organized network deployments, it is preferable to establish trust among the MRs before selecting the preferred path for sending traffic over the wireless back-haul.

Accordingly, embodiments presented herein apply attestation methods to source routing protocols, such as the OLSR and DSR protocols, implemented in wireless mesh and ad-hoc networks of MRs to provide proof of integrity of the MRs, while selecting routes or paths from source to destination nodes through the MRs, as described below.

With reference to FIG. 1, there is shown a block diagram of an example WMN 100 that implements source routing protocols, such as DSR and OLSR protocols, extended to include attestation methods to establish trust between nodes in the WMN. WMN 100 includes a mesh network 102 of 12 MRs MR-1-MR-12 (collectively, the "MRs") coupled to each other directly or indirectly via wireless mesh links (also referred to simply as "wireless links"), a source node SN (also referred to simply as a "source node") connected directly to each of MR-1, MR-5, and MR-9 through respective wireless links, and a destination node DN (referred to simply as a "destination node") connected directly to each of MR-4, MR-8, and MR-12 through respective wireless links. The MRs communicate with each other over wireless links, such as wireless back-haul links, as is known. In FIG. 1, WMN 100 includes 12 MRs by way of example only. In practice, there may be more or less MRs. The source node and the destination node are referred to as endpoint devices, and may each include a respective mesh router, or a general wireless computing device, such as a personal computer, smartphone, tablet, laptop, and so on. The MRs, the source node, and the destination node may be referred to as "nodes" of WMN 100.

According to embodiments presented herein, MR-1-MR-12, the source node, and the destination node of WMN 100 individually, and collectively, implement a source routing protocol that includes various new features described herein. Examples of the source routing protocol may include the DSR and OLSR protocols, extended or modified to include the various new features, although other protocols may implement the features described herein.

The DSR protocol is a reactive routing protocol. Generally, in the DSR protocol, the source node initiates route discovery in a WMN (e.g., WMN 100) by generating a Route Request (RREQ) packet and broadcasting it to all neighbor MRs (referred to simply as "neighbors") of the source. The RREQ packet includes an identity of the destination node and an accumulated path/route or sequence of MR hops (also referred to as a "source route") from the source node to the destination node. Each MR that is not the destination node and has not previously encountered the RREQ packet adds (e.g., appends) an address of the MR to the accumulated route and then re-broadcasts the RREQ packet to neighbors of the MR in the direction of the destination node. RREQ packet propagation/forwarding continues until the destination node is encountered. When the destination node receives the RREQ packet, the destination node generates a Route Reply (RREP) packet, copies the accumulated path/route (i.e., the source route) from the received RREQ packet into the RREP packet, and unicasts the RREP packet to the source node along the reverse path of the source route. In FIG. 1, a final source route (i.e., a final trusted path, also referred to as the preferred path) from the source node to the destination node through the MRs is shown as a solid line.

OLSR is a proactive link-state routing protocol, which uses Hello and Topology Control (TC) messages to discover and then disseminate link state information throughout a wireless mesh network (e.g., WMN 100). Individual nodes (i.e., MRs) use the topology information to compute next hop destinations for all nodes in the WMN using shortest hop forwarding paths.

As mentioned above, the embodiments presented herein add attestation methods to the OLSR and DSR protocols, for example, in WMN 100 to provide proof of integrity of the MRs, while selecting the source route between the source node and the destination node. The embodiments add attestation information generated by the attestation methods to the OLSR and DSL protocols as an extension that embeds a hardware finger print (e.g., derived from a Secure Unique Device Identifier (SUDI) or similar certificate and/or identity), a canary value or stamp, counters, time-ticks, and the like. The extensions are introduced as additions to the source routing protocols without breaking backwards compatibility with earlier versions of the protocols.

The embodiments provide attestation options as protocol extensions that are added to, and sent along with, the protocol packets/messages. For the DSR protocol, the embodiments add attestation information as another option to the RREQ and RREP packets. When a neighbor MR of an MR participating in DSR route selection with the neighbor MR sends to the MR an RREQ packet or an RREP packet including attestation information, the MR uses the attestation information to verify whether the neighbor MR is trustworthy or not trustworthy (i.e., compromised), and to make a decision as to whether to accept or reject the message, accordingly.

Similarly, for the OLSR protocol, the embodiments add attestation information as another option to the "Hello" and "Topology Control" (TC) protocol packets/messages. The MRs participating in route selection based on the OLSR protocol use the attestation information to verify whether the neighbors that sent the "Hello" and/or "Topology Control" packets are trustworthy or not trustworthy (i.e., compromised).

Figure 2:
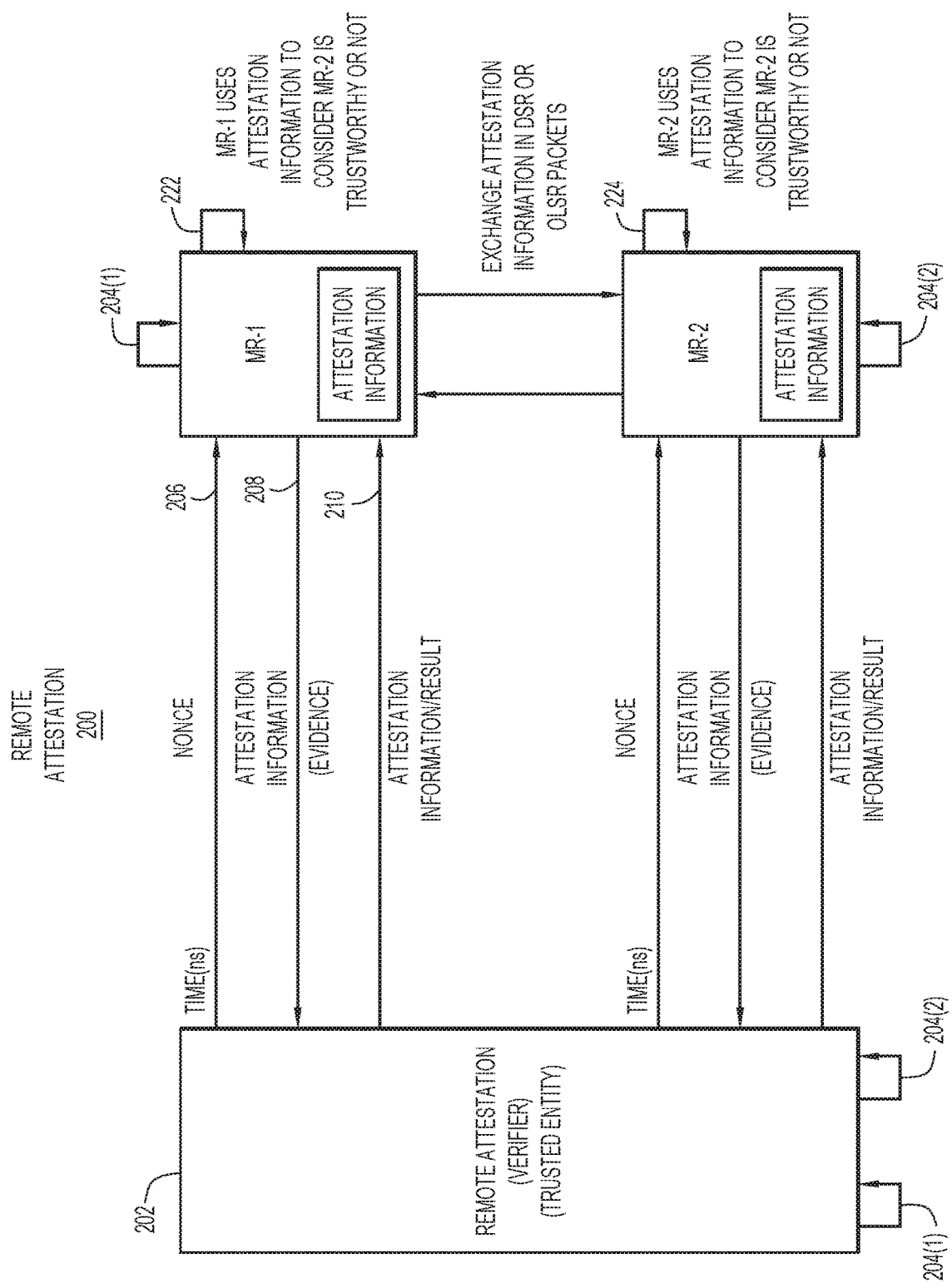
FIG. 2 is an illustration of an attestation methods or procedures performed by mesh routers (MRs) of the WMN, according to an example embodiment.

With reference to FIG. 2, there is an illustration of an example attestation methods or procedures 200 performed by the MRs. Attestation methods 200 employs a remote attestation entity or verifier 202 that is a trusted entity. Verifier 202, which acts as a central time stamp authority, communicates with the MRs over respective network links. Before performing source route selection, all of the MRs (e.g., MR-1 to MR-12) perform individual/respective attestation methods with verifier 202. In the example of FIG. 2, MR-1 and MR-2 perform respective attestation methods 204(1) and 204(2) with verifier 202, which install respective attestation information in the MRs. Attestation methods 204(1) and 204(2) may be considered initial or a priori attestation methods as they are generally performed prior to source selection. Attestation methods 204(1) and 204(2) are substantially the same. Therefore, the following description of attestation method 204(1) shall suffice for attestation method 204(2), and all other individual attestation methods performed with respect to other MRs, not shown.

For attestation method 204(1), at 206, verifier 202 generates a nonce (e.g., a signed random number) based on a timestamp, and sends the nonce to MR-1. In response to receipt of the nonce by MR-1, at 208, MR-1 (referred to as the "attester") assembles attestation information in the form of evidence indicative of trustworthiness of attributes/features of the MR, and sends the evidence to verifier 202. Examples of features of evidence include:
1. Identity (e.g., model, serial number) of MR-1, for providing a trustworthiness level as: identify-verified/identify-failed.
2. Hardware identity (e.g., a SUDI) of MR-1, for providing a trustworthiness level as: hardware-authentic/hardware-verification-failed.
3. Firmware identity (e.g., device drivers) of MR-1 for providing a trustworthiness level as: firmware-authentic/firmware-verification-failed.
4. Measurement lists, including a BIOS measurement list (integrity of the BIOS and bootloader) of MR-1, and a microloader measurement list (integrity of the microloader) of MR-1, for providing a trustworthiness level as: boot-verified/boot-verification-failed.
5. Software integrity (includes integrity of operating system (OS), libraries, and applications/processes) on MR-1 (also referred to as know good values (KGVs)), for providing a trustworthiness level as: software-verified/software-verification-failed.

In response to receipt of the evidence by verifier 202, at 210, the verifier verifies the evidence to select trustworthiness levels for the features of MR-2, as listed above for example. Based on the verification, verifier 202 sends to MR-1 attestation information in the form of an attestation result indicative of whether MR-1 is trustworthy, i.e., is trusted or compromised. For example, verifier 202 sends to MR-1 a single trustworthiness vector comprising a set of the trustworthiness levels for the above features (e.g., trustworthiness vector=1001110, in which bit positions in the vector represent respective feature trustworthiness levels, a logic "1" represents "verified," and a logic "0" represents "failed"). MR-1 stores the attestation result for subsequent sharing/exchange with other MRs prior to or during source route selection. In an example, the attestation result may include a canary stamp to represent, concisely, the proof of integrity.

For attestation method 204(2), the aforementioned attestation operations are repeated with respect to MR-2. Generally, the respective initial/a priori attestation methods install in the respective MRs respective attestation results indicative of whether the MRs are trustworthy.

Once initial attestation methods 204(1) and 204(2), and the attestation methods for the remaining MRs in mesh network 102, are complete, the source node, the MRs, and the destination node may perform source route selection that uses the attestation results established in the MRs by the initial attestation methods. Source router selection results in selection of a trusted route or sequence of trusted MR hops from the source node to the destination node. During source route selection, the MRs exchange their respective attestation results in DSR/OLSR packets, i.e., the attestation results are used for source routing.

For example, during source route selection, at 220, MR-1 and MR2 exchange attestation information/results with each other via DSR/OLSR packets. That is, MR-1 sends to MR2 MR-1 attestation information/results indicative of whether MR-1 is trustworthy, and MR-2 sends to MR1 MR-2 attestation information/results indicative of whether MR-1 is trustworthy. At 222, MR-1 determines whether MR-2 is trustworthy, i.e., whether MR-2 is a trusted MR or a compromised MR based on the MR-2 attestation information/results. MR-1 generates a trust indicator associated with/for MR-2 that indicates whether MR-2 is trusted or compromised. Similarly, at 224, MR-2 determines whether MR-1 is trustworthy, i.e., whether MR-1 is a trusted MR or a compromised MR based on the MR-1 attestation information/results. MR-2 generates a trust indicator associated with/for MR-1 that indicates whether MR-1 is trusted or compromised.

When MR-1 receives a DSR/OLSR packet forwarded by MR-2 for source route selection, MR-1 populates an accumulated source route (also referred to an "accumulated path") in the packet with the trust indicator for MR-2, and forwards the packet toward the destination node. Similarly, when MR-2 receives a DSR/OLSR packet forwarded by MR-1 for source route selection, MR-2 populates an accumulated path in the packet with the trust indicator for MR-1, and forwards the packet toward the destination node. Eventually, the destination node receives the DSR/OLSR packets carrying their respective accumulated paths (i.e., accumulated source routes) annotated with the trust indicators for the MRs listed in the accumulated paths. The destination node selects a preferred source route or path from among the accumulated paths based in part on the trust indicators associated with the accumulated paths.

Figure 3:
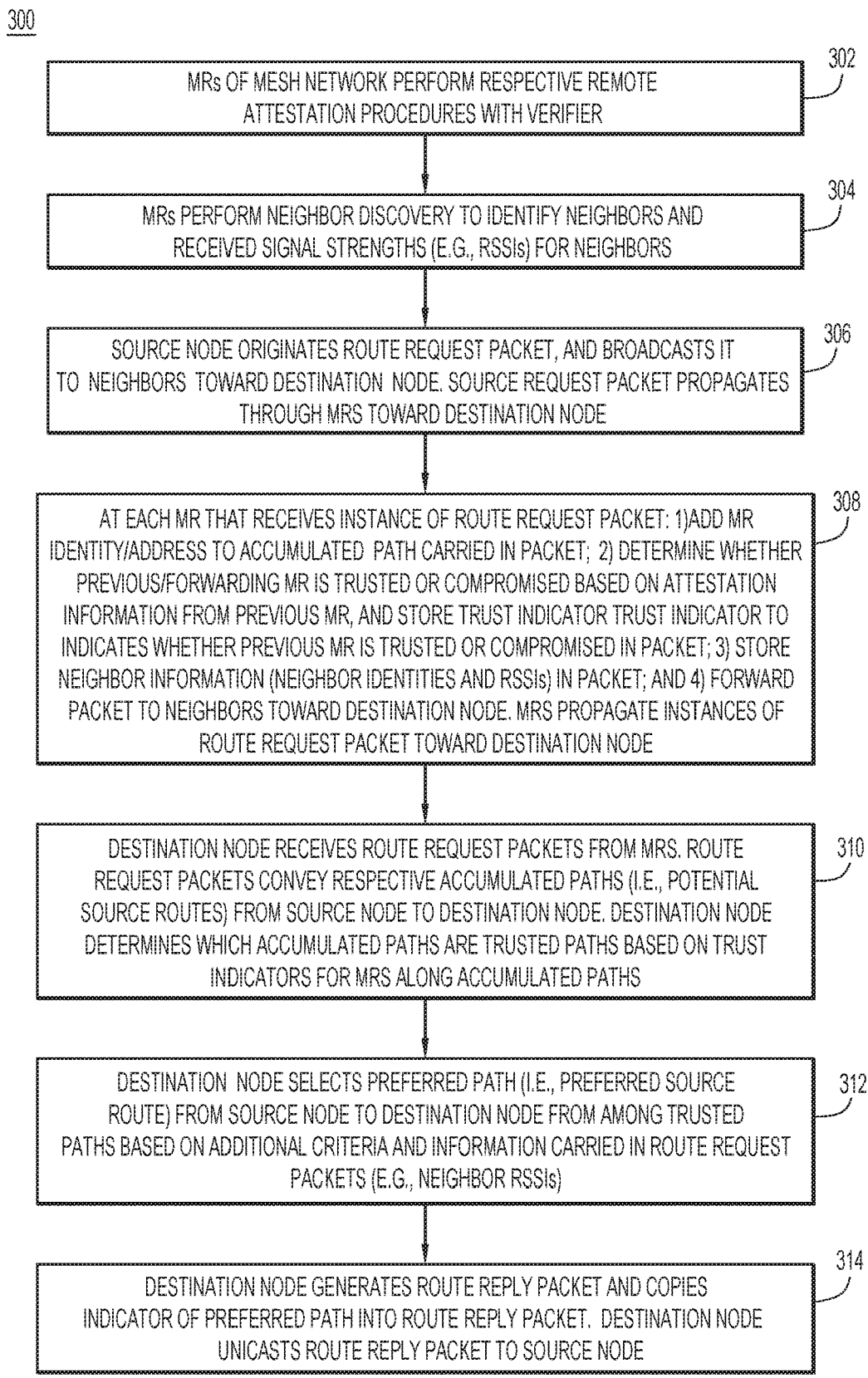
FIG. 3 is a flowchart of a method of performing source route selection in the WMN based on the attestation method, according to an example embodiment.

With reference to FIG. 3, there is a flowchart of an example method 300 of performing source route selection in WMN 100 based on attestation methods and information mentioned above. In the ensuing description, the term "route request packet" broadly refers to an RREQ packet, a Hello packet, and a TC packet, while the term "route reply packet" broadly refers to an RREP or other packet that conveys a selected router/path back to a source node, unless otherwise specified.

At 302, initially, the MRs perform respective attestation methods with verifier 202 as described above. The attestation methods install respective attestation results indicative of MR trustworthiness in the MRs. That is, the attestation result stored in each MR is indicative of whether that MR trustworthy.

At 304, the MRs each (i) performs neighbor discovery to identify respective neighbors (e.g., by their addresses and/or other identities), (ii) measures received signal strengths associated with wireless transmission from the respective neighbors, and (iii) stores in a local "neighbor" record the identities of the neighbors that are discovered in association with their corresponding received signal strengths. As a result of operation 304, all of the MRs store respective neighbor records that list identities of neighbors and their received signal strengths. The discovery may employ a Radio Resource Management (RRM) Neighbour Discovery Protocol (NDP), in which the MRs frequently exchange RRM NDP broadcast packets with each other over the air.

In an example, the received signal strengths may be Received Signal Strength Indicators (RSSIs) corresponding to the neighbors as measured at the MR. The RSSIs represent measures of proximity or relative location of the neighbors to the MR. That is, the RSSIs represent how near or close the neighbors are to the MR; the assumption being that the higher an RSSI of a neighbor, the nearer that neighbor is to the MR, and vice versa.

After, or concurrent with, operation 304, source route selection from the source node to the destination node is performed, as described below.

At 306, to initiate the source route selection, the source node originates a route request packet, and broadcasts the route request packet to neighbors linked directly to the source node. The route request packet (also referred to simply as the "request packet") is a broadcast packet that includes a source address for the source node, a destination address for the destination node, and an accumulated path or sequence of identities of MRs that is initially set to a null set by the source node. In an example, the identities may include addresses of MRs (e.g., IP address or the like) along the accumulated path.

Due to the broadcast nature of the request packet originated at the source node, each MR that receives an instance of the request packet from a previous or upstream MR (where the source node is considered to be upstream from the destination node, and the request packets flow from the source node to the destination node in the downstream direction), process the route request packet as described below, and then broadcasts/forwards the packet to surrounding or neighbor MRs toward the destination node. The MR thus becomes a previous MR or "previous hop" with respect to the surrounding MRs. In turn, the surrounding MRs process and broadcast the instances of the request packets received from the MR, until many instances of the original request packet have propagated through mesh network 102 to the destination node along various/different paths. Next operation 308 corresponds to processes/operations performed by each MR when an instance of a request packet traverses that MR.

At 308, when an MR receives a request packet from a previous or upstream MR that forwarded the packet to the MR (i.e., the MR receives the request packet from a previous hop along the accumulated path), the MR performs the following operations with respect to the request packet. First, the MR appends or adds its address to an accumulated path (i.e., an accumulated source route) in the request packet.

Second, the MR determines whether the previous MR that forwarded the request packet is trusted or compromised based on an attestation result sent to the MR by the previous MR, as described above in connection with FIG. 2. When the MR determines the previous MR is trusted, the MR sets a trust indictor for the previous MR to a first value that indicates that the pervious MR is trusted. Conversely, when the MR determines the previous MR is compromised, the MR sets the trust indictor for the previous MR to a second value that indicates the previous MR is compromised. The MR annotates the address of the previous MR in the accumulated route with the trust indicator for the previous MR. For example, the MR associates the trust indicator with the address for the previous MR, and may store the trust indicator with the accumulated route.

Third, the MR copies its local neighbor record into the request packet in association with the address of the MR. That is, the MR copies the identities of its neighbors and their RSSIs into the request packet, in association with its own address.

Fourth, the MR broadcasts/forwards the updated request packet to next MRs in mesh network 102, which respectively perform the processes of operation 308 with respect to those request packets.

Over time, the MRs respectively perform operation 308 and propagate multiple instances of the request packet from the source node to the destination node along respective paths through mesh network 102. Each request packet conveys a respective accumulated path represented as a list of addresses of all of the MRs that were traversed from the source node to the destination node, respective trust indicators for the MRs along the accumulated path (i.e., that comprise the hops along the accumulated path), and respective neighbor records for each of the MRs along the accumulated path.

Table 1 below shows example information conveyed in a router request packet, including a partial accumulated path ($1^{st}$ column), trust indicators for each MR in the accumulated path ($2^{nd}$ column), and discovered neighbor information for each MR in the accumulated path ($3^{rd}$ column).

TABLE 1

| | Accumulated Path (MR identities) | |
| --- | --- | --- |
| Source Node | Trust Indicator | Discovered Neighbor MR identities + RSSIs |
| MR-1 | Trusted | (MR-5, RSSI), (MR-2, RSSI), (MR-6, RSSI) |
| MR-2 | Compromised | (MR-1, RSSI), (MR-6, RSSI), (MR-3, RSSI) . . . |
| MR-3 | Trusted | (MR-2, RSSI), (MR-7, RSSI), (MR-4, RSSI) . . . |

At 310, the destination node receives the request packets, and examines the contents in the request packets. The destination node determines which of the accumulated paths are trusted paths based on the trust indicators for the mesh routers along the accumulated paths. A trusted path is an accumulated path for which all of the MRs along the accumulated path are indicated as being trusted.

At 312, the destination node determines/selects a preferred path among the trusted paths based on additional criteria and information associated with the trusted paths that is also carried in the request packets, such as the neighbor records (i.e., the neighbor identities and their associated RSSIs).

At 314, in response to the original route request packet, the destination node generates a route reply and unicasts/forwards the route reply back to the source node through mesh network 102. The route reply includes a source address for the destination node, a destination address for the source node, and an indication of the preferred path, i.e., the identities of the MRs that define the preferred path. The preferred path is also referred to as the finally selected "source route." The route reply traverses the MRs of the preferred path in reverse from the order in which they were traversed from the source node to the destination node.

Figure 4:
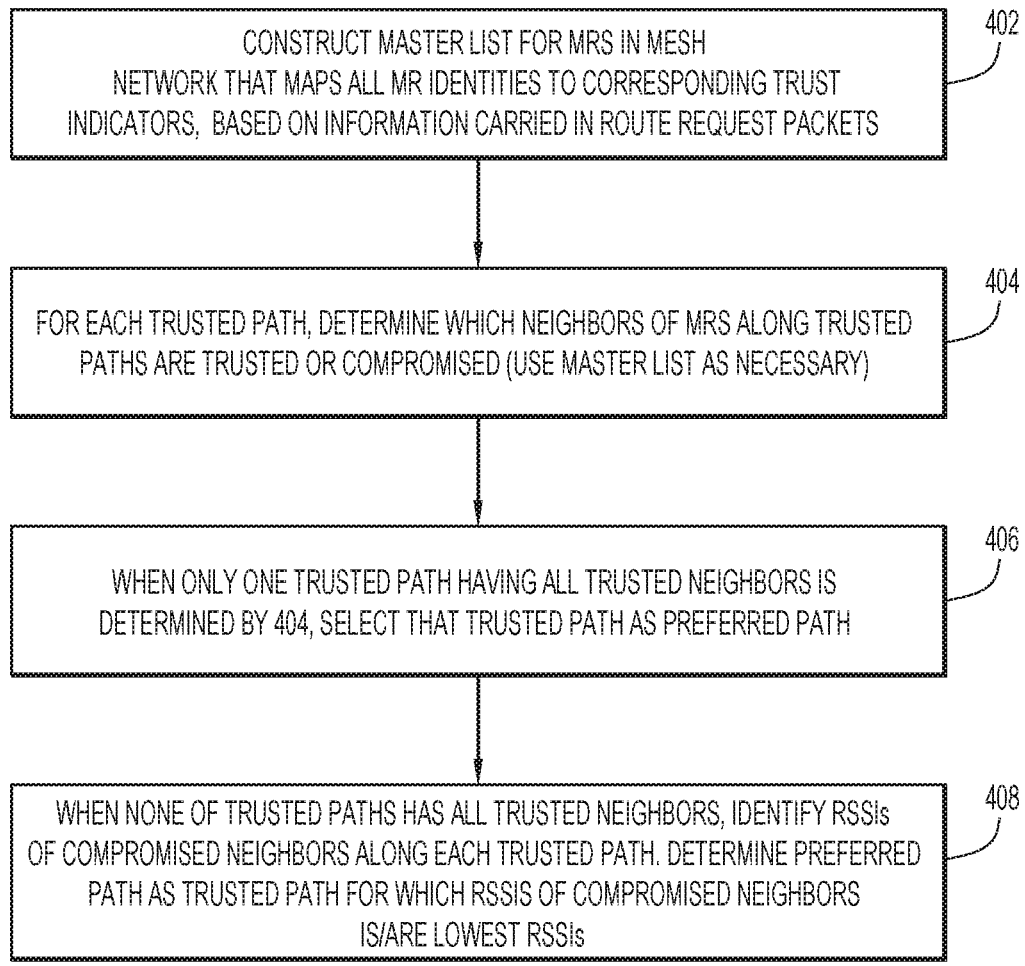
FIG. 4 shows example operations expanding on selecting a preferred path from trusted paths performed in the method of FIG. 3, according to an example embodiment.

With reference to FIG. 4, there are shown example operations 400 expanding on operation 312 used to select the preferred path from the trusted paths.

At 402, the destination node constructs a master list of all of the identities/identifiers of the MRs in mesh network 102 indicated in the accumulated paths. Then, the destination node associates the identities in the master list with their corresponding trust indicators, either trusted or compromised, as conveyed in the accumulated paths of the route request packets. That is, the destination node maps each MR identity to its corresponding trust indicator. Given an MR identity, the destination node may use the master list to access the trust indicator corresponding to the MR identity. The destination node may consult the master list as needed in next operations 404-408.

At 404, the destination node determines, for each trusted path, which of the neighbors of the MRs along the trusted path are either trusted neighbors or compromised neighbors. The destination node may consult the master list to ascertain trust indicators for the neighbors based on their addresses.

At 406, when operation 404 determines only a single trusted path (e.g., a first trusted path) that has all trusted neighbors, the destination node selects the single trusted path as the preferred path. When operation 404 identifies multiple trusted paths that each have all trusted neighbors, the destination node selects one of the trusted paths as the preferred path based on any number of selection criterion, such as least number of hops, and so on.

At 408, when operation 404 determines that none of the trusted paths has all trusted neighbors, the destination node identifies the RSSIs of the compromised neighbors along each of the trusted paths. The destination node determines the preferred path as the trusted path (e.g., a second trusted path) among the trusted paths for which the RSSIs of the compromised neighbors are lowest.

Figure 5:
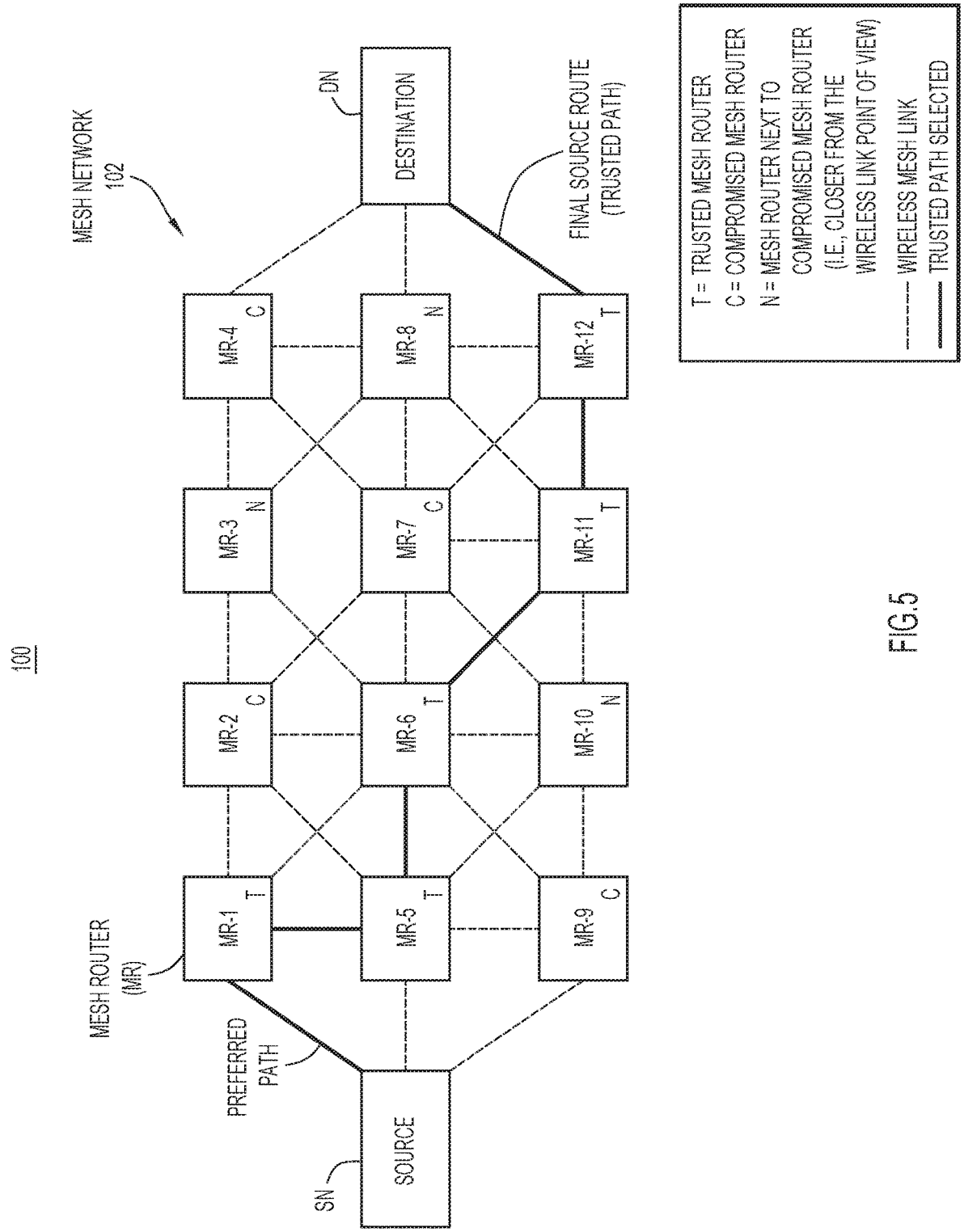
FIG. 5 is an illustration of an example of source route selection used to select a preferred path through the WMN using the methods of FIGS. 3 and 4, according to an example embodiment.

With reference to FIG. 5, there is an illustration of an example in which source route selection has determined a preferred path through WMN 100 using methods presented herein. The example is first described at a high-level. The solid line connecting the source node, MR-1, MR-5, MR-6, MR-11, MR-12, and the destination node represents the preferred path finally selected by the source route selection. The source route selection ignores compromised MRs, including MR-2, MR-4, MR-7, and MR-9, for purposes of trusted route selection. That is, the destination node does not consider as a trusted path any accumulated path that includes one or more of the compromised MRs.

Compared to wired networks, the wireless infrastructure of mesh network 102 is more susceptible to corruption because compromised MRs are able to "sniff" wireless packets on the air when the wireless packets are exchanged between trusted MRs near the compromised MRs. Operating under this assumption, the source route selection considers trusted MRs (e.g., MR-3, MR-8, MR-10) that are adjacent or next to compromised MRs as suspect MRs that should not form part of the finally selected preferred path. That is, the source route selection carefully evaluates a trusted path having an MR near a compromised neighbor to determine whether there is an alternative, "better," trusted path. When comparing trusted paths that each have compromised neighbors, the source route selection prefers the trusted path having respective compromised neighbors with lowest RSSIs compared to other trusted paths, because the compromised neighbors having the lowest RSSIs are least likely to intercept and decode wireless packets transmitted by the MRs of the preferred path over the air.

In the example topology of FIG. 5, source path selection selects preferred path MR-1, MR-5, MR-6, MR-11, and MR-12 between the source node and the destination node, based on the factors above, i.e., all of the MRs on the accumulated path are trusted, and have lowest RSSIs for their compromised neighbors.

The following details expand on the high-level example above. In the example, the source node and the destination nodes are both MRs and are, therefore, referred to as a "source MR" and a "destination MR," respectively.
 1. The source MR broadcasts an RREQ containing the identity of the destination MR to all neighbors of the source MR. The neighbors of source MR are MR-1, MR-5, and MR-9.
 2. The RREQ packet carries attestation information, so that the next MR in the path to the destination MR can validate to verify the proof of integrity of the MR from which the RREQ packet is received. More specifically, the source MR appends its attestation information to the RREQ packet so that the next MRs (e.g., MR-1, MR-5, MR-9) in the path to the destination MR can verify the proof of integrity of the source MR.
 3. On MR-1 (but the same is applicable for all other MRs which processing the RREQ packet):
    A. MR-1 validates the proof of integrity of the source MR, from which the RREQ packet is received, and verifies that the source MR that sent the RREQ packet (simply "RREQ") is trustworthy.
       a. If the source MR that sent the RREQ is not trustworthy, then mark that the source MR is compromised.
       b. If the source MR that sent the RREQ is trustworthy, then mark the source MR as trusted.
    B. If MR-1 is not the destination and has not previously encountered the RREQ (for that destination), MR-1 appends its address to the source route of (i.e., the accumulated path in) the RREQ.
    C. MR-1 appends the state of the MR (here, the source MR) from which the RREQ is received. The state of the MR is "trusted," compromised," or "not evaluated/none." The state "not evaluated/none" is a default value that is not modified to "trusted"/"compromised" whenever the MR does not validate the proof of integrity of the previous MR from which the RREQ is received. An example is when the MR itself is compromised.
    D. MR-1 appends its attestation information to the RREQ so that the next MR in the path to the destination can validate to verify the proof of integrity of the MR that sent the RREQ.
    E. MR-1 would have already detected its neighbors, including the source MR, MR-2, MR-5, and MR-6.
    F Measure/detect RSSIs (signal strengths of) the neighbors as indicators of how "close" or "far" the neighbors from MR-1).
    G. MR-1 appends neighbor information (i.e., neighbor identity along with RSSI value, with respect to MR-1) to the RREQ.
    H. MR-1 re-broadcasts the RREQ to its own neighbors in the path to the destination MR; neighbors of MR-1 in the path toward the destination include MR-2, MR-5, and MR-6.
 4. Operations under (3) above apply to other neighbors of the source MR, including MR-5 and MR-9.
 5. The above operations (1)-(4) above complete a first hop/level in the path to the destination MR.
 6. Similarly, in a next hop/level, MR-2, MR-6, and MR-10 verify the trustworthiness of the respective previous MRs (MR-1, MR-5, MR-9), whichever MR sent/broadcasted the RREQ.
 7. The above process, including operation (3) to (6), continue until the destination MR receives the RREQs (possibly from multiple MRs as they are broadcast packets).
 8. Based on information in each RREQ, the destination MR validates the proof of integrity of the MR from which it has received the RREQ and ignores the RREQ if it is received from non-trustworthy (compromised) MR.
 9. Based on information in the RREQs, the destination MR ignores paths with compromised MRs for the final source route selection, for which a unicast RREP (Route Reply) is generated. The RREP traverses the reverse path of the source route.
 10. While ignoring paths with compromised MRs, the destination MR uses neighbor information (i.e., neighbor identities and their associated RSSIs) from the RREQ to ignore even trusted paths, which are nearest to compromised MRs, so that the compromised MRs are unlikely to decode packets transmitted wirelessly between trusted MRs. That is:
  A. If an RSSI for a compromised neighbor MR of a trusted path is relatively high, then the compromised MR can likely capture and decode packets transmitted wirelessly between the trusted MRs, hence the destination MR ignores the trusted path in path selection.
  B. If the RSSI is very low, then the compromised MR will not be able to capture and decode the wireless packets properly, which raises the probability of selecting the trusted path for the final source route (preferred path) selection if there is no other trusted path available.
11. Hence, the destination MR ignores even the trusted path that is nearest to the compromised MRs in the final source route selection for which the unicast RREP is generated.
12. Overall, in the final route selection, the destination MR ignores both the path with compromised MRs and the trusted path that is nearest to the compromised MRs compared to other trusted paths.

Above operations (1)-(12) result in the following possible paths between the source MR and the destination MR.
1. Source MR->MR-1->MR-2->MR-3->MR-4->Destination MR.
  A. For this path, the RREQ received at the destination MR contains information that indicates:
    MR-1 is not detected as a trusted MR or a compromised MR by MR-2 (as MR-2 itself is compromised).
    MR-2 is detected as a compromised MR by MR-3.
    MR-3 is not detected as trusted or compromised by MR-4 (as MR-4 itself is compromised).
  B. MR-4 is detected as compromised by the destination MR itself.
  C. As the destination MR has detected MR-4 as compromised, the destination MR ignores the path.
2. Source MR->MR-1->MR-2->MR-3->MR-8->Destination MR.
  A. For this path, the RREQ received at the destination MR contains information that indicates:
    MR-1 is detected neither as trusted nor compromised by MR-2 (as MR-2 itself is compromised).
    MR-2 is detected as compromised by MR-3.
    MR-3 is detected as trusted by MR-9.
  B. MR-8 is detected as trusted by the destination MR itself.
  C. As the destination MR found that MR-2 is compromised, the destination MR ignores the path.
3. Source MR->MR-1->MR-2->MR-7->MR-4->Destination MR. Here, MR-4 is detected as compromised by the destination MR, hence the destination MR ignores the path.
4. Source MR->MR-1->MR-2->MR-7->MR-8->Destination MR. Here, the RREQ received at the destination MR contains information that indicates to the destination MR that MR-7 is compromised, hence the destination MR ignores the path.
5. Source MR->MR-1->MR-2-.MR-7->MR-12->Destination MR. Here, the RREQ received at the destination MR, contains information that indicates MR-7 is detected as compromised by MR-12, hence the destination MR ignores the path.
6. Source MR->MR-1->MR-6->MR-7->MR-8->Destination MR. Here, MR-7 is detected as compromised by MR-8, hence the path is ignored.
7. Source MR->MR-1->MR-6->MR-11->MR-12->Destination MR. Here:
  A. MR-1 is detected as trusted by MR-6.
  B. MR-6 is detected as trusted by MR-11.
  C. MR-11 is detected as trusted by MR-12.
  D. MR-12 is detected as trusted by the destination MR.
  E. As all MRs in the path are trusted, the path is selected as a trusted path toward the source MR, but subject to the following condition: if any other better trusted paths are not found. This path becomes the $1^{st}$ trusted path.
8. Source MR->MR-1->MR-6->MR-3->MR-4->Destination MR. Here, MR-4 is detected as compromised by the destination MR, hence the path is ignored.
9. Source MR->MR-1->MR-6->MR-3->MR-8->Destination MR. Here:
  A. MR-1 is detected as trusted by MR-6.
  B. MR-6 is detected as trusted by MR-3.
  C. MR-3 is detected as trusted by MR-8.
  D. MR-8 is detected as trusted by the destination MR itself.
  E. As all MRs in the path are trusted, the path is selected as the $2^{nd}$ trusted path toward source MR, but subject to: if any other better trusted paths are not found.
10. Source MR->MR-1->MR-6->MR-10->MR-11->MR-12->Destination MR. Here:
  A. MR-1 is detected as trusted by MR-6.
  B. MR-6 is detected as trusted by MR-10.
  C. MR-10 is detected as trusted by MR-11.
  D. MR-11 is detected as trusted by MR-12.
  E. MR-12 is detected as trusted by the destination MR itself.
  F. As all MRs in the path are trusted, the path is selected as the $3^{rd}$ trusted path toward the source MR, but subject to: if any other better trusted paths are not found.
11. Source MR->MR-1->MR-5->MR-10->MR-11->MR-12->Destination MR. Here:
  A. MR-1 is detected as trusted by MR-5.
  B. MR-5 is detected as trusted by MR-10.
  C. MR-10 is detected as trusted by MR-11.
  D. MR-11 is detected as trusted by MR-12.
  E. MR-12 is detected as trusted MR by the destination MR itself.
  F. As all MRs in the path are trusted, the path is selected as the $4^{th}$ trusted path toward the source MR, but subject to: if any other better trusted paths are not found.
12. Source MR->MR-1->MR-5->MR-6->MR-11->MR-12->Destination MR. Here:
  A. MR-1 is detected as trusted by MR-5.
  B. MR-5 is detected as trusted by MR-6.
  C. MR-6 is detected as trusted by MR-11.
  D. MR-11 is detected as trusted by MR-12.
  E. MR-12 is detected as trusted by the destination MR itself.
  F. As all MRs in the path are trusted, the path is selected as the $5^{th}$ trusted path toward source MR, but subject to: if any other better trusted paths are not found.

In the topology/deployment shown in FIG. 5, the compromised MR list include MR-2, MR-4, MR-7, and MR-9.

In the above list of 12 paths between the source and destination MRs, the following 5 trusted paths are found:
1. Source MR->MR-1->MR-6->MR-11->MR-12->Destination MR. In this path, MR-6 shared neighbors MR-2 and MR-7, which are part of the compromised MR list.

Also, wireless path "MR-1->MR-6" is closest to MR-2, which is compromised. Hence, the destination MR tries to ignore the path.

2. Source MR->MR-1->MR-6->MR-3->MR-8->Destination MR. Here, MR-3 is a neighbor of MR-2, MR-7, and MR-4, which are compromised. Also, MR-6->MR-3" and "MR-3->MR-8" paths are closest to MR-2, MR-7, and MR-4. Hence, the destination MR ignores this path.
3. Source MR->MR-1->MR-6->MR-10->MR-11->MR-12->Destination MR. Here, MR-10 is a neighbor of MR-9, which is compromised. Also, path "MR-6->MR-10" is closest to MR-9. Hence, the destination MR ignores the path.
4. Source MR->MR-1->MR-5->MR-10->MR-11->MR-12->Destination MR. Here, also, MR-10 is a neighbor of MR-9, which is compromised. Also, path "MR-5->MR-10" is closest to MR-9. Hence, the destination MR ignores the path.
5. Source MR->MR-1->MR-5->MR-6->MR-11->MR-12->Destination MR. Here, MR-5 is a neighbor of MR-9 (which is a compromised), and MR-6 is a neighbor of MR-2 and MR-7 (which are also compromised), but the RSSI value is very low, so the compromised MR will not be able to capture and decode wireless packets. Hence, this trusted path is selected as the final source route (i.e., preferred path) for generating the unicast RREP packet toward the source MR.

With reference to FIGS. 6 and 7, there are shown illustrations of example protocol extension options of DSR/OLSR packets extended to carry attestation information.

FIG. 6 is an illustration of an example generic message 600 that includes an option type field 602, an option length field 604, and an option value field 606 for the attestation information.

FIG. 7 is an illustration of an example more specific message 700 in which field 602 indicates a DSR_OLSR_Attestation_Token, field 604 indicates the length, and field 606 carries a hardware fingerprint, and further attestation information.

Figure 8:
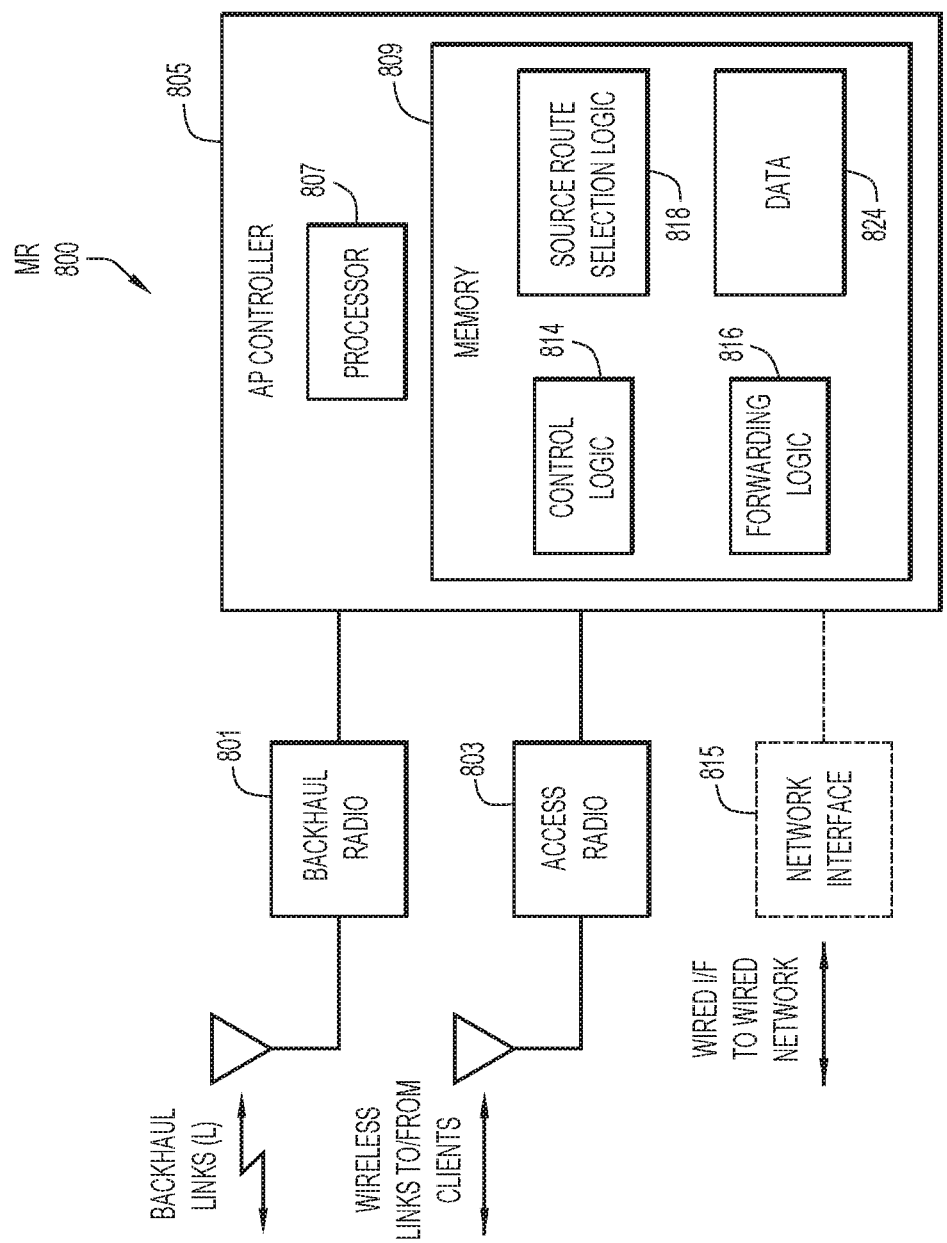
FIG. 8 is a block diagram of a mesh router that may perform functions associated with operations for the embodiments presented herein, according to an example embodiment.

With reference to FIG. 8, there is shown a block diagram of an example MR 800 of WMN 100 configured to perform operations according to embodiments presented provided herein. MR 800 represents the MRs depicted in FIGS. 1, 8, and 5, for example. MR 800 includes a wireless backhaul radio 801 (also referred to a transmitter/receiver or "transceiver" 801) to support wireless backhaul links, a wireless access radio 803 to support access for wireless clients served by the MR, and an MR controller 805 to which the backhaul and access radios are coupled. In an embodiment, radios 801 and 803 are integrated into a single radio. Backhaul radio 801 may operate according to IEEE 802.11a in the approximately 5 Gigahertz band, and access radio 803 may operative according to IEEE 802.11b/g in the approximately 8.4 GHz band. Each radio includes a respective set of one or more antennas. MR 800 may include a wired network interface 815 that enables the MR to connect to a wired network when available.

Controller 805 includes a processor 807 and memory 809. Processor 807 is a microcontroller or microprocessor, for example, configured to execute software instructions stored in memory 809. Memory 809 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 809 may comprise one or more computer readable storage media (e.g., a memory device) encoded with software comprising computer executable instructions and when the software is executed (by processor 807) it is operable to perform the operations described herein.

For example, memory 809 stores or is encoded with instructions for: control logic 814 to perform overall control of MR 800; forwarding/routing logic 816 to perform forwarding of packets based on forwarding/routing tables stored in the MR; source route selection logic 818 to source route selection in accordance with a source routing protocol, as described herein. Logic modules 816 and 818 are depicted as separate and distinct from control logic 814 in FIG. 8 for purposes of convenience; however, it is to be understood that portions of each of logic modules 814, 816, and 818 may be, in practice, incorporated into control logic 814. Memory 809 also stores information/data 824 generated and used by logic 814-818.

Figure 9:
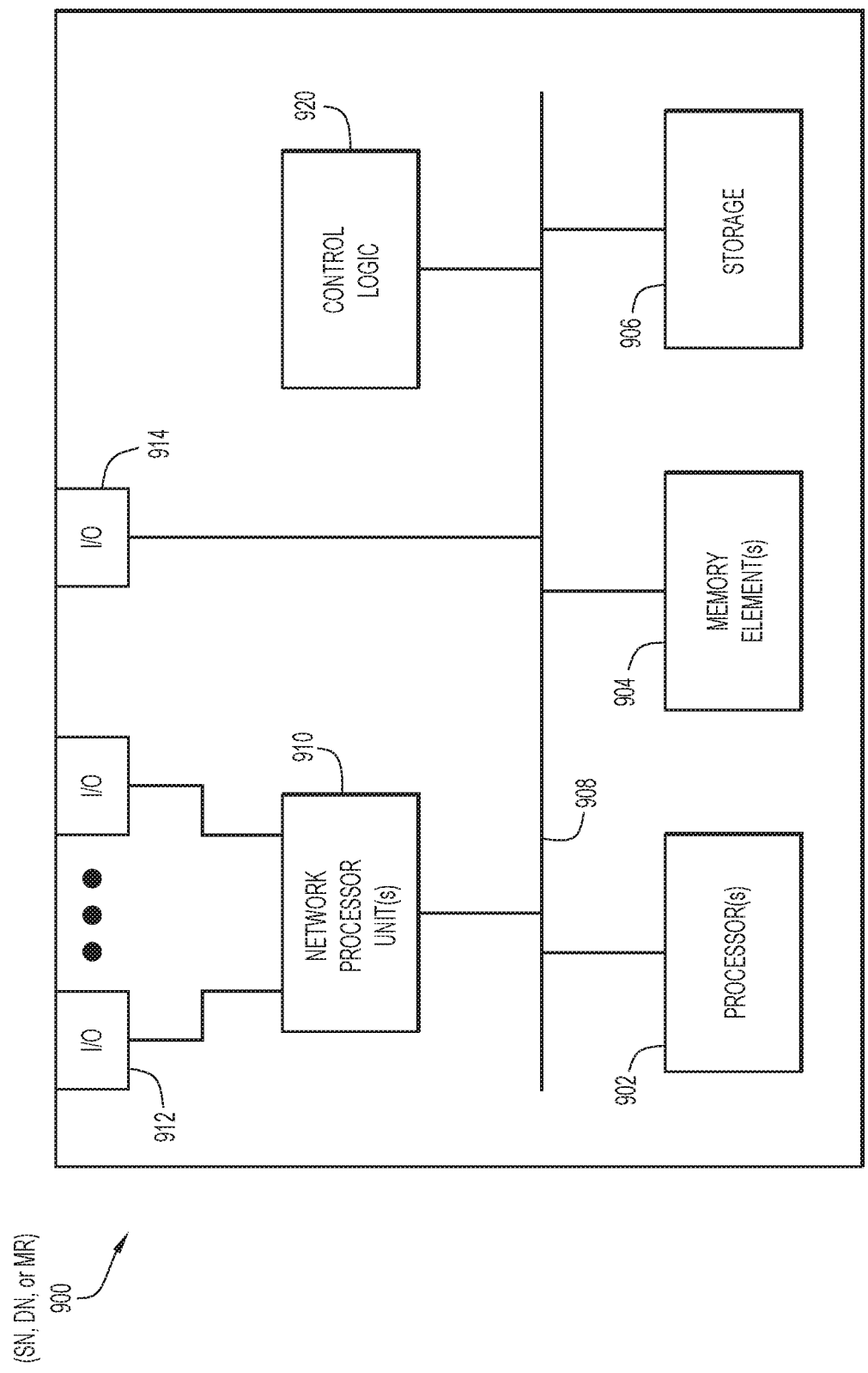
FIG. 9 is a hardware block diagram of a computing device corresponding to a source node, a destination node, or a mesh router that may perform functions associated with operations for the embodiments presented herein, according to an example embodiment.

Referring to FIG. 9, there is an illustration of a hardware block diagram of a computing device configured to perform operations for the embodiments presented herein. In various embodiments, a computing device, such as computing device 900 or any combination of computing devices 900, may be configured as any entity/entities as discussed for the techniques depicted in connection with FIGS. 1-6 in order to perform operations of the various techniques discussed herein. For example, computing device 900 may represent or implement a source node, a destination node, or an MR as described above.

In at least one embodiment, computing device may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, radio ports, and/or any other I/O port(s) now known or hereafter developed. Thus, the network processor unit(s) 910 and/or network I/O interfaces 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory elements 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 9) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, embodiments presented herein apply attestation methods to source routing protocol, such as OLSR and DSR protocols extended according to the embodiments, of wireless mesh and ad-hoc networks for providing proof of integrity while selecting routes between source and destination nodes. The embodiments provide trustworthiness to OLSR protocol messages (Hello, Topology Control) exchanged between MRs to find the optimal path. The embodiments provide trustworthiness to DSR protocol messages (RREQ and RREP) exchanged between MRs to find the optimal path.

The attestation methods used herein may employ any known or hereafter attestation technology to verify the integrity of the MRs. Generally, attestation is a trusted computing technology which can be applied to verifying integrity in networking. It can be applied to a router/switch to review logs from L1 or L2 connected devices which maintains these logs in trusted storage. These logs can be known to be un-compromised, as a manufacturer would embed the private key into every trust anchor produced for a hardware device, and the device's public key would be published as a certificate. The peering device then pushes reports of integrity measurements and updates from trusted storage periodically and/or on some log/measurement entry event. Reviewing any provided signed logs allows a good understanding of the current trustable state of a peer device. Also, by reviewing the set of transactions which have occurred since boot-time, a determination can be made regarding the trustworthiness of the information which the peer device is asserting. Trusted platform module (TPM) functionality is now embedded in a wide variety of devices including mobile phones, PCs, and routers. Attestation as defined by the Trusted Computing Group (TCG) describes how the TPM can be used as a hardware root of trust and offer Proof of Integrity of a node, where integrity includes: hardware; software—micro loader, BIOS, boot loader, kernel, operating system; Runtime—application binaries, libraries and config/manifest files. All of the foregoing may be applied to the attestation methods and attestation information produced thereby with respect to the MRs.

In one aspect, a method is provided comprising: at an destination node connected to network of wireless mesh routers configured to implement a source routing protocol in which the mesh routers propagate route request packets broadcasted by a source node to the destination node, the mesh routers configured to process the route request packets by adding their addresses to accumulated paths in the route request packets, and by adding trust indicators to the accumulated paths to indicate whether mesh routers among the mesh routers from previous hops along the accumulated path are trusted or compromised mesh routers: receiving from the mesh routers the route request packets, which convey the accumulated paths; determining trusted paths among the accumulated paths for which all of the mesh routers along the accumulated paths are trusted based on the trust indicators for the accumulated paths; determining a preferred path among the trusted paths; and forwarding an indication of the preferred path to the source node via the mesh routers.

In another aspect, an apparatus is provided comprising: an interface to communicate with wireless mesh routers configured to implement a source routing protocol in which the mesh routers propagate route request packets broadcasted by a source node to a destination node, the mesh routers configured to process the route request packets by adding their addresses to accumulated paths in the route request packets, and by adding trust indicators to the accumulated paths to indicate whether mesh routers among the mesh routers from previous hops along the accumulated path are trusted or compromised mesh routers; and a processor of the destination node, the processor coupled to the interface and configured to perform: receiving from the mesh routers the route request packets, which convey the accumulated paths; determining trusted paths among the accumulated paths for which all of the mesh routers along the accumulated paths are trusted based on the trust indicators for the accumulated paths; determining a preferred path among the trusted paths; and forwarding an indication of the preferred path to the source node via the mesh routers.

In yet another aspect, a non-transitory compute readable medium is provided. The medium is encoded with instructions that, when executed by a processor, cause the processor of a destination node connected to wireless mesh routers configured to implement a source routing protocol in which the mesh routers propagate route request packets broadcasted by a source node to the destination node, the mesh routers configured to process the route request packets by adding their addresses to accumulated paths in the route request packets, and by adding trust indicators to the accumulated paths to indicate whether mesh routers among the mesh routers from previous hops along the accumulated path are trusted or compromised mesh routers, cause the processor to perform: receiving from the mesh routers the route request packets, which convey the accumulated paths; determining trusted paths among the accumulated paths for which all of the mesh routers along the accumulated paths are trusted based on the trust indicators for the accumulated paths; determining a preferred path among the trusted paths; and forwarding an indication of the preferred path to the source node via the mesh routers.

In a further aspect, a system is provided, comprising: a destination node; and mesh routers of a network to forward request packets broadcasted by a source node to the destination node accordance to a source routing protocol, each mesh router configured to: perform remote attestation with a trusted entity to establish in each said mesh router an attestation result indicative of trustworthiness of each said mesh router; and upon receiving from a previous node a route packet of the route packets and an attestation result for the previous node: add an address of each said mesh router to an accumulated path in the request packet; based on the attestation result, add to the request packet a trust indicator to indicate the previous mesh router is trusted or compromised; and forward the request packet to the destination node; and wherein the destination node is configured to, upon receiving from the mesh routers the request packets which convey accumulated paths and trust indicators for the mesh routers along the accumulated paths, determine trusted paths among the accumulated paths for which all of the mesh routers along the accumulated paths are trusted based on the trust indicators for the accumulated paths.

The destination node may be further configured to: determine a preferred path among the trusted paths; and forward an indication of the preferred path to the source node via the mesh routers.

Each mesh router may be further configured to discover addresses of neighbors and add the addresses to the request packet; and the destination node may be configured to determine the preferred path by: determining which of the neighbors of the mesh routers along the one or more trusted paths are trusted or compromised based on trust indicators for the neighbors as conveyed in the accumulated paths of the request packets; and selecting the preferred path among the trusted paths based on results of the determining which of the neighbors of the mesh routers along the one or more trusted paths are trusted or compromised.

Each mesh router may be further configured to measure Received Signal Strength Indicators (RSSIs) for the neighbors, and add the RSSIs to the request packet; and the destination node may be further configured to: discover addresses of neighbors and add the addresses to the request packet; and the destination node may be configured to determine the preferred path by: determining which of the neighbors of the mesh routers along the one or more trusted paths are trusted or compromised based on trust indicators for the neighbors as conveyed in the accumulated paths of the request packets; and selecting the preferred path among the trusted paths based on results of the determining which of the neighbors of the mesh routers along the one or more trusted paths are trusted or compromised.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a destination node connected to mesh routers configured to perform attestation and neighbor discovery that results in the mesh routers storing trust indicators to indicate whether the mesh routers are trusted or compromised and neighbor lists identifying neighbors and Received Signal Strength Indicators (RSSIs) for the neighbors, the mesh routers further configured to propagate route request packets broadcasted by a source node to the destination node and add, to accumulated paths in the route request packets, addresses of the mesh routers, the trust indicators, and the neighbor lists for the mesh routers:
upon receiving from the mesh routers the route request packets, determining trusted paths among the accumulated paths for which all of the mesh routers along the accumulated paths are trusted, and determining whether each of the trusted paths has all trusted neighbors;
when at least one of the trusted paths has all trusted neighbors, selecting a first trusted path of the least one of the trusted paths as a preferred path;
when none of the trusted paths has all trusted neighbors, selecting the preferred path as a second trusted path among the trusted paths that has compromised neighbors, using the RSSIs; and
forwarding an indication of the preferred path to the source node via the mesh routers.

2. The method of claim 1, wherein:
determining whether each of the trusted paths has all trusted neighbors includes determining which of the neighbors of the mesh routers along the trusted paths are trusted neighbors or compromised neighbors based on trust indicators for the neighbors as conveyed in the accumulated paths of the route request packets.

3. The method of claim 1, wherein the mesh routers include wireless mesh routers.

4. The method of claim 1, wherein
selecting the second trusted path includes selecting the second trusted path for which RSSIs of the compromised neighbors are lowest.

5. The method of claim 1, wherein:
forwarding includes unicasting a route reply packet to the source node through the mesh routers, the route reply packet including the indication of the preferred path.

6. The method of claim 1, wherein the route request packets are part of a source routing protocol based on a Dynamic Source Routing (DSR) protocol or an Optimized Link State Routing (OLSR) protocol.

7. The method of claim 1, wherein receiving includes receiving each of the route request packets to include:
a respective accumulated path including a sequence of the addresses of the mesh routers comprising the respective accumulated path; and
respective ones of the trust indicators corresponding to the addresses of the mesh routers comprising the respective accumulated path.

8. The method of claim 1, further comprising, at each mesh router:
prior to propagating the route request packets, performing attestation with a remote trusted verifier device to establish a respective attestation result that includes a respective trust indicator in each said mesh router.

9. The method of claim 8, further comprising, at each mesh router:
upon receiving, from a previous mesh router, a route request packet of the route request packets and an attestation result for the previous mesh router, determining whether the previous mesh router is a trusted mesh router or a compromised mesh router based on the attestation result;
setting a trust indicator for the previous mesh router to indicate the previous mesh router is trusted or compromised based on results of determining whether the previous mesh router is trusted or compromised;
populating the route request packet with the trust indicator; and
forwarding the route request packet toward the destination node.

10. An apparatus comprising:
an interface to communicate with mesh routers configured to perform attestation and neighbor discovery that results in the mesh routers storing trust indicators to indicate whether the mesh routers are trusted or compromised and neighbor lists identifying neighbors and Received Signal Strength Indicators (RSSIs) for the neighbors, the mesh routers further configured to propagate route request packets broadcasted by a source node to a destination node and add, to accumulated paths in the route request packets, addresses of the mesh routers, the trust indicators, and the neighbor lists for the mesh routers; and
a processor of the destination node, the processor coupled to the interface and configured to perform:
upon receiving from the mesh routers the route request packets, determining trusted paths among the accumulated paths for which all of the mesh routers along the accumulated paths are trusted, and determining whether each of the trusted paths has all trusted neighbors;
when at least one of the trusted paths has all trusted neighbors, selecting the at least one of the trusted paths as a preferred path;

when none of the trusted paths has all trusted neighbors, selecting the preferred path as a second trusted path of the trusted paths that has compromised neighbors, using the RSSIs; and forwarding an indication of the preferred path to the source node via the mesh routers.

11. The apparatus of claim 10, wherein the processor is configured to perform determining whether each of the trusted paths has all trusted neighbors by:
determining which of the neighbors of the mesh routers along the trusted paths are trusted neighbors or compromised neighbors based on trust indicators for the neighbors as conveyed in the accumulated paths of the route request packets.

12. The apparatus of claim 10, wherein the mesh routers include wireless mesh routers.

13. The apparatus of claim 10, wherein
the processor is configured to perform selecting the second trusted path by selecting the second trusted path for which RSSIs of the compromised neighbors are lowest.

14. The apparatus of claim 10, wherein the processor is configured to perform the forwarding by unicasting a route reply packet to the source node through the mesh routers, the route reply packet including the indication of the preferred path.

15. The apparatus of claim 10, wherein the route request packets are part of a source routing protocol based on a Dynamic Source Routing (DSR) protocol or an Optimized Link State Routing (OLSR) protocol.

16. A non-transitory computer readable medium encoded with instructions that, when executed by a processor of a destination node connected to mesh routers configured to perform attestation and neighbor discovery that results in the mesh routers storing trust indicators to indicate whether the mesh routers are trusted or compromised and neighbor lists identifying neighbors and Received Signal Strength Indicators (RSSIs) for the neighbors, the mesh routers further configured to propagate route request packets broadcasted by a source node to the destination node and add, to accumulated paths in the route request packets, addresses of the mesh routers, the trust indicators, and the neighbor lists for the mesh routers, cause the processor to perform:

upon receiving from the mesh routers the route request packets, determining trusted paths among the accumulated paths for which all of the mesh routers along the accumulated paths are trusted, and determining whether each of the trusted paths has all trusted neighbors;

when at least one of the trusted paths has all trusted neighbors, selecting the at least one of the trusted paths as a preferred path;

when none of the trusted paths has all trusted neighbors, selecting the preferred path as a second trusted path of the trusted paths that has compromised neighbors, using the RSSIs; and forwarding an indication of the preferred path to the source node via the mesh routers.

17. The non-transitory computer readable medium of claim 16, wherein:
the instructions to cause the processor to perform determining whether each of the trusted paths has all trusted neighbors include instructions to cause the processor to perform determining which of the neighbors of the mesh routers along the trusted paths are trusted neighbors or compromised neighbors based on trust indicators for the neighbors as conveyed in the accumulated paths of the route request packets.

18. The non-transitory computer readable medium of claim 16, wherein the mesh routers include wireless mesh routers.

19. The non-transitory computer readable medium of claim 16, wherein
the instructions to cause the processor to perform selecting the second trusted path include instructions to cause the processor to perform selecting the second trusted path for which RSSIs of the compromised neighbors are lowest.

20. The non-transitory computer readable medium of claim 16, wherein the route request packets are part of a source routing protocol based on a Dynamic Source Routing (DSR) protocol or an Optimized Link State Routing (OLSR) protocol.

* * * * *

UNITED STATES PATENT AND TRADEMARK OFFICE
CERTIFICATE OF CORRECTION

PATENT NO. : 11,570,684 B2
APPLICATION NO. : 17/034615
DATED : January 31, 2023
INVENTOR(S) : Niranjan M M et al.

Page 1 of 1

It is certified that error appears in the above-identified patent and that said Letters Patent is hereby corrected as shown below:

In the Claims

Claim 13, Column 23, Line 17, please replace "claim 10, wherein" with --claim 10, wherein:--

Claim 19, Column 24, Line 31, please replace "claim 16, wherein" with --claim 16, wherein:--

Signed and Sealed this
Fourteenth Day of March, 2023

Katherine Kelly Vidal
*Director of the United States Patent and Trademark Office*